United States Patent
Angel et al.

(10) Patent No.: US 6,833,879 B1
(45) Date of Patent: Dec. 21, 2004

(54) IMAGE PROJECTION IN TELEVISION OFF POSITION

(75) Inventors: Maria Angel, Irvine, CA (US); Anthony Roberts, Huntington Beach, CA (US); Jeffrey G. Whitelaw, Corona, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 0 days.

(21) Appl. No.: 09/648,440

(22) Filed: Aug. 25, 2000

(51) Int. Cl.[7] .............................. H04N 5/64; H04N 9/31
(52) U.S. Cl. ...................... 348/744; 348/744; 348/787; 348/789
(58) Field of Search .......................... 348/744, 36, 121, 348/122, 123, 789, 383, 787; 353/94, 20, 30

(56) References Cited

U.S. PATENT DOCUMENTS

| | | | | |
|---|---|---|---|---|
| 4,124,285 A | * | 11/1978 | Johnson et al. ............... 353/28 |
| 4,231,643 A | * | 11/1980 | Demick et al. ................ 353/86 |
| 4,483,681 A | * | 11/1984 | Weinblatt ..................... 434/236 |
| 4,846,694 A | * | 7/1989 | Erhardt ........................ 434/365 |
| 5,363,149 A | * | 11/1994 | Furuno et al. .............. 348/789 |
| 5,699,104 A | | 12/1997 | Yoshinobu |
| 5,703,662 A | | 12/1997 | Yoon ........................... 348/728 |
| 5,902,030 A | * | 5/1999 | Blanchard ..................... 353/30 |
| 5,959,717 A | * | 9/1999 | Chaum ......................... 352/40 |
| 6,064,668 A | * | 5/2000 | Brown ........................ 370/357 |
| 6,285,371 B1 | * | 9/2001 | Gould et al. ................. 345/422 |

* cited by examiner

*Primary Examiner*—Michael H. Lee
*Assistant Examiner*—Trang U. Tran
(74) *Attorney, Agent, or Firm*—Orricl, Herrington & Sutcliffe LLP

(57) ABSTRACT

A system and method that facilitates the transformation of PTVs, when in the "OFF" mode, into aesthetically pleasing decorative furniture. The PTV preferably includes a primary and a secondary projection system. The secondary projection system preferably comprises a projection unit optically coupled to the screen of the PTV and an auxiliary image source coupled to the projection unit. Preferably, the program logic of the PTV directs the projection of an image from the secondary projection unit onto the screen when the PTV is in the "OFF" mode.

27 Claims, 6 Drawing Sheets

IMAGE PROJECTION IN TELEVISION OFF POSITION

FIELD OF THE INVENTION

The present invention relates generally to projection televisions (PTVs), and more particularly to a projection system that facilitates transforming PTVs into aesthetically pleasing decorative furniture.

BACKGROUND OF THE INVENTION

PTVs or "big screen" TVs are a popular alternative to picture tube TVs because they provide comparably larger viewable screens that cannot be efficiently produced using conventional picture tubes. The size of the screens typically range from about 45 to about 65 inches along their diagonal, while the enclosures typically range from about 48 inches to over 60 inches in height and from about 38 inches to over 50 inches in width. Because of their large screen and overall size, the "big-screen" TVs, whether "ON" or "OFF", tend to dominate any room in which they a placed. In an "ON" position, the "bigscreen" TV is a functional part of the room's decor, providing the viewer with theater-like viewing of a broadcast event or movie presentation. However, because of its imposing overall size and large blank, dark screen, the "big-screen" TV, when in an "OFF" position, tends to become a non-functional and aesthetically displeasing feature of the room.

Thus, it would be desirable to provide a projection system that facilitates transforming PTVs, when in an "OFF" position, into aesthetically pleasing decorative furniture.

SUMMARY OF THE INVENTION

The present invention is directed to a system and method that facilitates the transformation of PTVs in the "OFF" mode into aesthetically pleasing decorative feature of the room in which they are located. In a particularly innovative aspect of the invention, the PTV includes a primary and a secondary or auxiliary projection system. The auxiliary projection system preferably comprises a projection unit optically coupled to the screen of the PTV and an auxiliary image source coupled to the projection unit. Preferably, the program logic of the PTV directs the projection of an image from the auxiliary projection system onto the screen when the PTV is in the "OFF" mode.

Other aspects and features of the present invention will become apparent from consideration of the following description taken in conjunction with the accompanying drawings.

DETAILED DESCRIPTION OF PREFERRED EMBODIMENTS

The auxiliary image projection system of the present invention facilitates the transformation of a PTV or "big-screen" TV in the "OFF" mode into an aesthetically pleasing decorative piece of furniture by projecting an image onto the viewing screen. The image projected while the PTV is in "OFF" mode can be a static photographic or digital image, or a dynamic image such as a slideshow or movie. As a result, the viewer, if desired, no longer needs to endure the non-functional and aesthetically displeasing attributes of the PTV's large dark, blank screen while in the "OFF" position.

Figure 1:
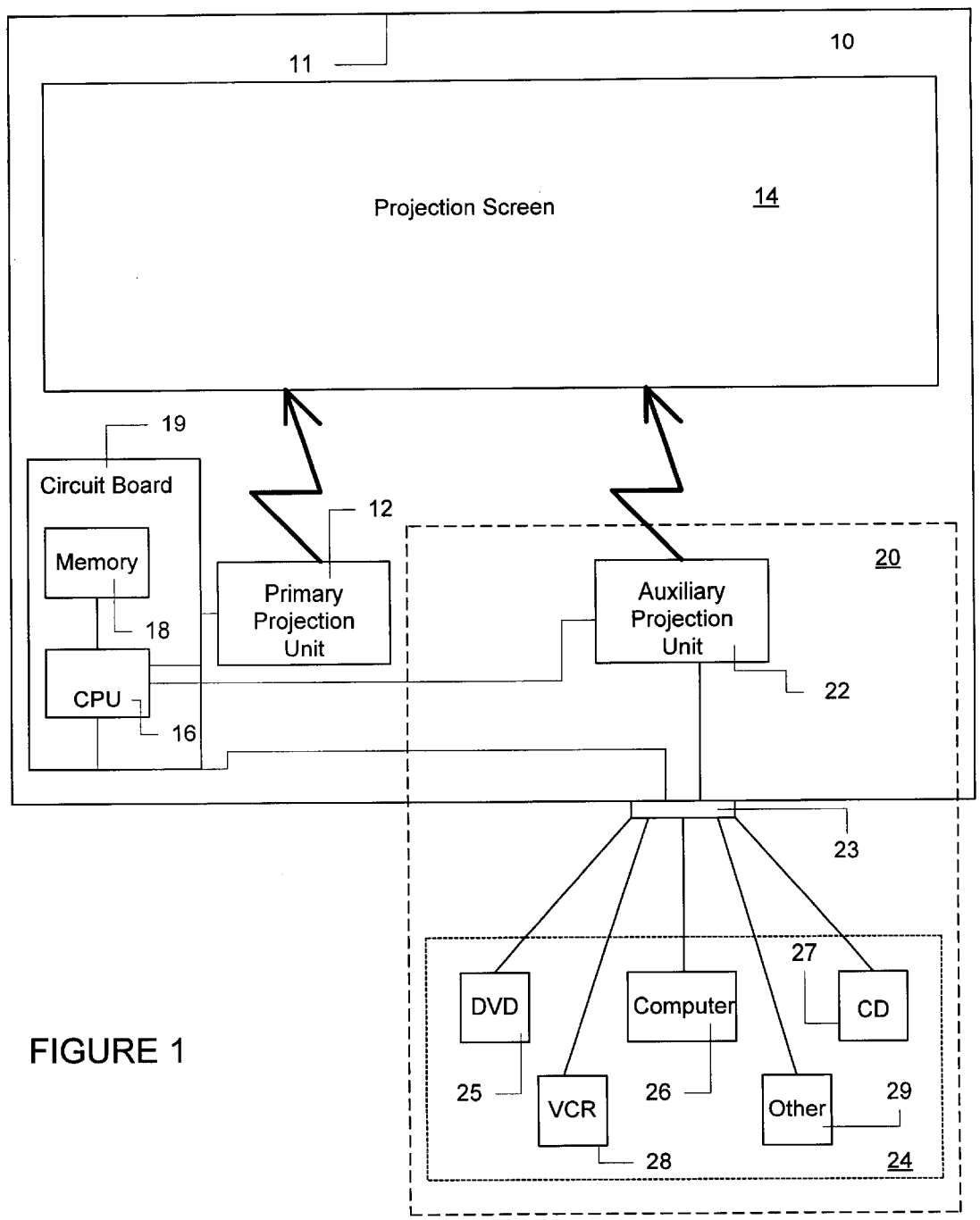
FIG. 1 is a schematic view of a PTV incorporating an auxiliary projection system of the present invention.

Referring to FIG. 1, a PTV 10 including an auxiliary image projection system 20 of the present invention is shown schematically. Like conventional PTVs, the PTV 10 of the present invention includes a projection unit (primary) 12 comprising red, green, and blue cathode ray tubes (CRTs) optically coupled to a mirror, a viewing or projection screen 14 optically coupled to the mirror and CRTs, and electronic circuitry for receiving and transmitting an image to the projection unit 12 for projecting of the same onto the screen 14. Included within the electronic circuitry is a central processor unit (CPU) 16 having programmable logic for controlling the operation of the PTV 10 and memory 18 for the storage of data related to the operation of the PTV 10. The CPU 16 and memory 18 are mounted on a printed circuit board 19 within the cabinet 11 of the PTV 10.

The auxiliary projection system 20 preferably comprises an auxiliary projection unit 22 coupled to the CPU 16 and optically coupled to the screen 14. The auxiliary projection unit 22 is preferable used to project an image onto the screen 14 when the PTV 10 is in the "OFF" mode to avoid damaging the CRTs of the primary projection unit 12. When CRTs are used to display still images for an extended period of time, the phosphor coating on the CRTs can be damaged resulting in ghost images being displayed during future use.

The auxiliary projection unit 22 may be a conventional projector capable of projecting an image from a photographic slide onto the screen 14 and/or capable of receiving and projecting a digital image from an image source 24 onto the screen 14. Depending on the design and size of the PTV's 10 cabinet 11, the auxiliary projection unit 22 may be mounted internally or externally to the cabinet 11.

The image or video source 24 is coupled to the auxiliary projection unit 22 and may include a photographic slide receptacle (not shown) on or within the auxiliary projection unit 22; a programmable logic module within the programmable logic of the PTV 10 adapted to retrieve an image or video stored in the memory 18 of the PTV 10 or secondary memory (not shown); a computer or CPU device 26 with a memory, a hard drive, and/or a floppy (3.5") drive; a compact disc ("CD") device 27, a digital video display ("DVD") device 25, a video cassette recorder ("VCR") 28, or some other image or video source device 29. Preferably, the PTV 10 would include one or more of the image source devices 24, i.e., the DVD device 25, the CPU device 26, the CD device 27, the VCR 28, or other device 29, internally mounted within the cabinet 11 of the PTV 10 and electrically coupled to the electronic circuitry of the PTV 10. Alternatively, these image source devices 24 may be externally mounted and coupled to the electronic circuitry of the PTV 10 through connectors commonly know in the art, such as VGA, 1394, etc. By being coupled to the electronic circuitry of the PTV 10, the image source 24 can be controlled by the programmable logic of the PTV 10, i.e., the image source 24 could power-up and run a set-up program when the PTV 10 program logic instructs the image source 24 to play.

In an alternative embodiment, an externally mounted image source 24 could be coupled directly to the auxiliary projection unit 22. In operation, the image source 24 would be manually operated, i.e., turned on and caused to play, when the auxiliary projection unit 22 is activated or turned on.

Figure 2:
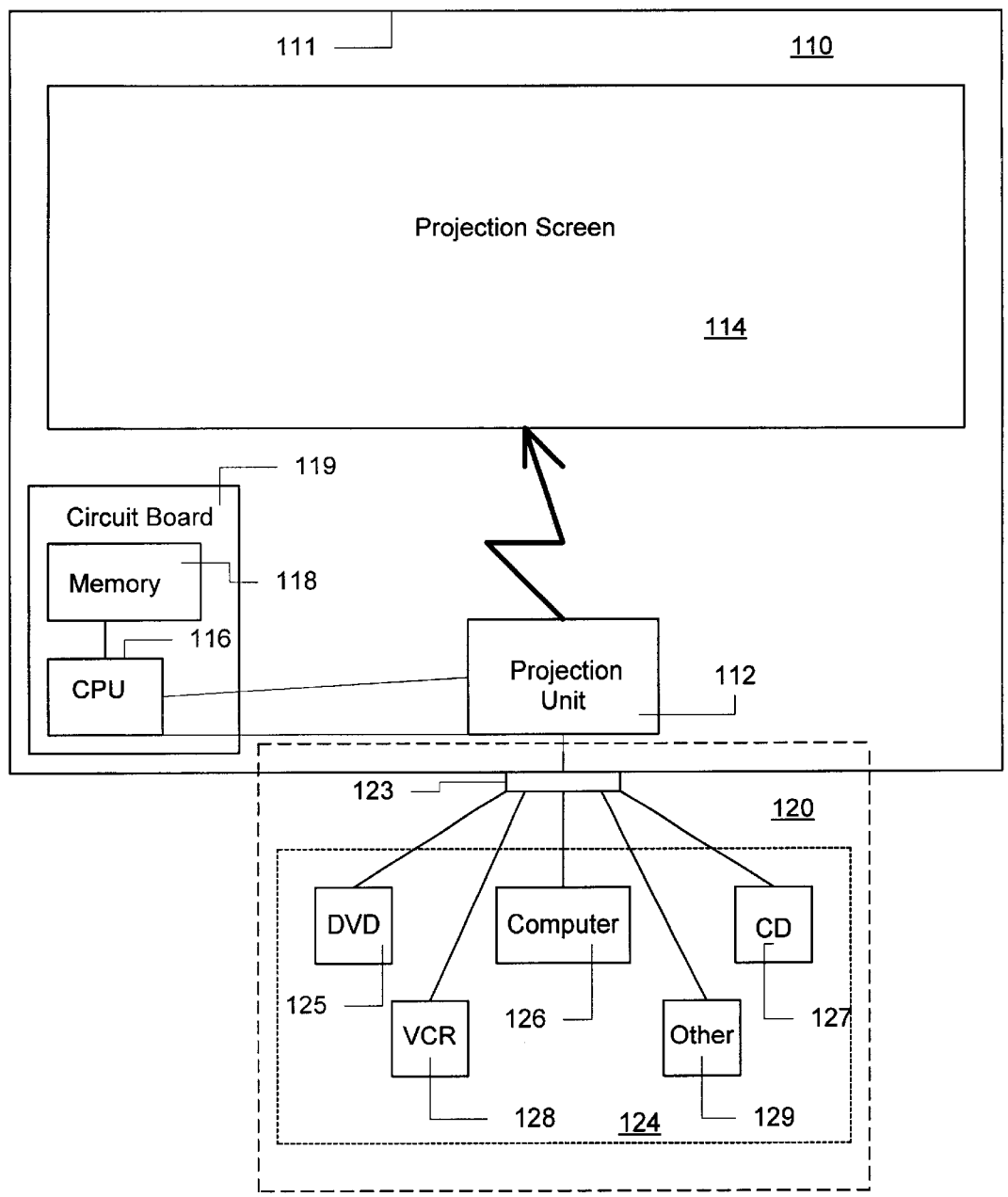
FIG. 2 is a schematic view of alternative embodiment of a PTV incorporating an auxiliary projection system of the present invention.

In another alternative embodiment shown in FIG. 2, the PTV 110 includes a single projection unit 112 optically coupled to the screen 114 and an auxiliary projection system 120. The projection unit 112 includes a light source or lamp, a color wheel optically coupled to the lamp and which continuously spins during operation, and a microprocessor chip upon which several tiny mirrors are mounted in an array. Most recent developments have produced a microprocessor chip comprising one million mirrors arranged in a 1280 by 760 array. The image is communicated to the microprocessor chip, which in turn manipulates the mirrors to project the colored light transmitted by the lamp and color wheel onto the screen as the desired image. Because this PTV 110 does not include any CRTs, there tends to be no risk that any of the components would be damaged in a manner that would cause ghost images to be produced. Thus, a second or auxiliary projection unit is unnecessary unless it is desirable to prevent excess wear on the lamp, which may shorten the lamp's life.

Like the preferred embodiment shown in FIG. 1, the PTV 110 the auxiliary projection system 120 includes an image or video source 124, which in this embodiment is coupled to the main projection unit 112 of the PTV 110. The image or video source 124 may include a programmable logic module within the programmable logic of the PTV 110 used to retrieve an image or video stored in the memory 118 of the PTV 110 or secondary memory (not shown); a computer or CPU device 126 with a memory, a hard drive, and/or a floppy drive; a compact disc ("CD") device 127, a digital video display ("DVD") 125, a video cassette recorder ("VCR") 128, or some other image or video source device 129. Preferably, one or more of the image source devices 124 may be internally mounted within the cabinet 111 of the PTV 110 and electrically coupled to the electronic circuitry of the PTV 110. Alternatively, these image source devices 124 may be externally mounted and coupled to the electronic circuitry of the PTV 110 through appropriate connectors. The image source 124 can be controlled by the programmable logic of the PTV 110, i.e., the image source 124 could power-up and run a set-up program when the PTV 110 program logic instructs the image source 124 to play.

Figure 3:
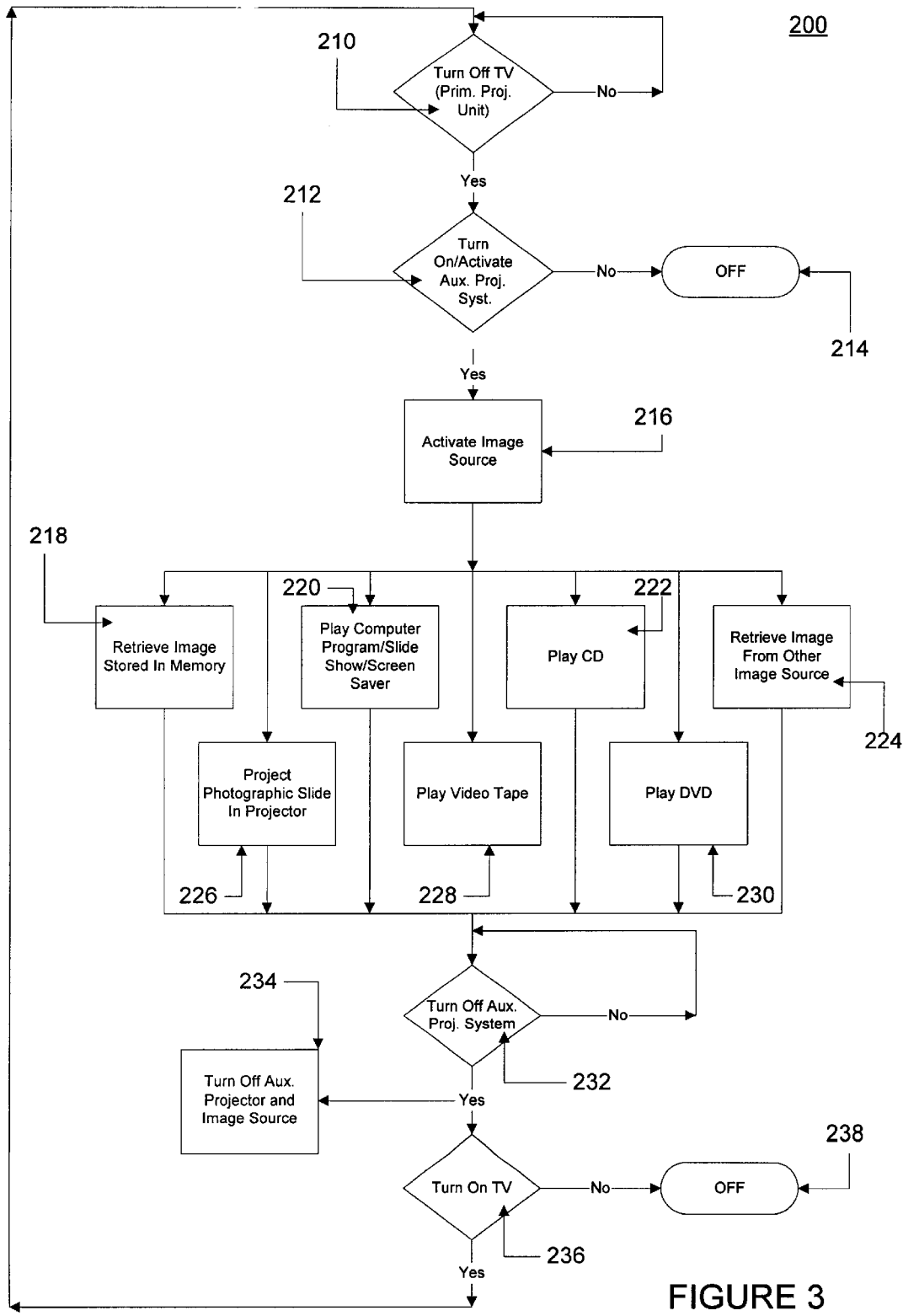
FIG. 3 is a flow chart illustrating the operation of the auxiliary projection system of the present invention.
Figure 5:
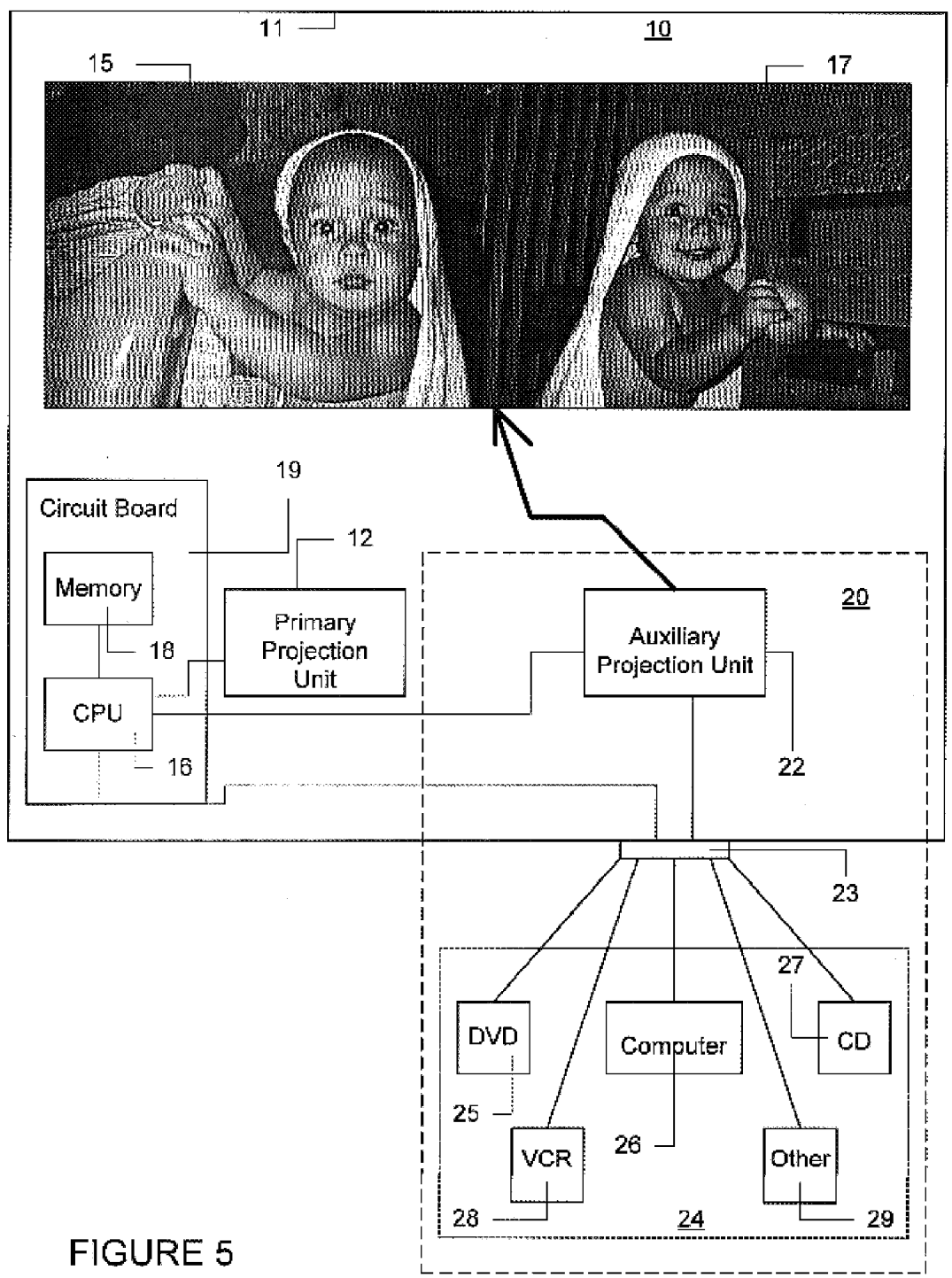
FIG. 5 is a schematic view of the PTV and auxiliary projection system of the present invention in the activated mode.
Figure 6:
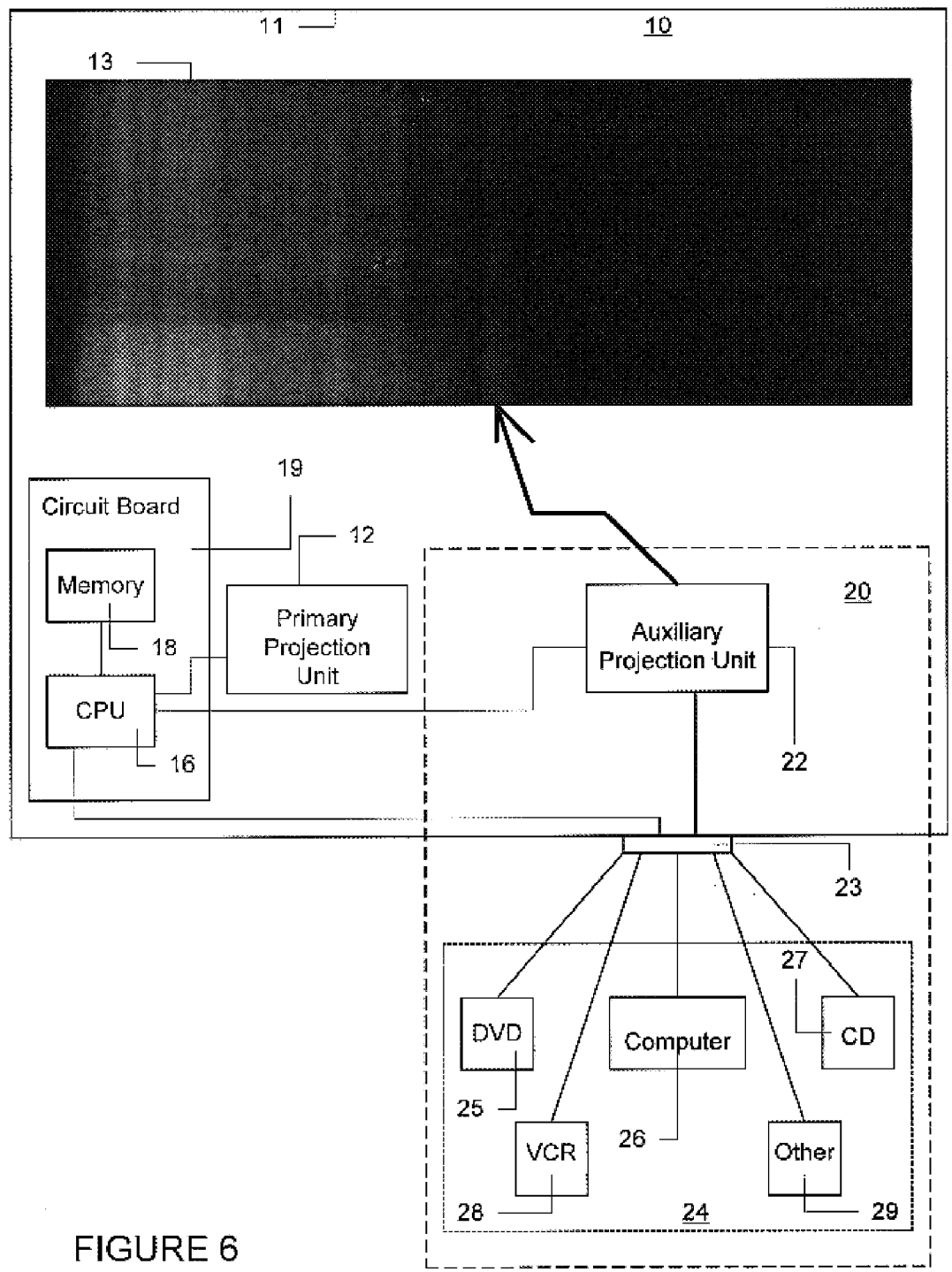
FIG. 6 is a schematic view of the PTV and auxiliary projection system of the present invention in the "OFF" mode.

The operation 200 of the preferred embodiment, which is shown in FIG. 3, is described in conjunction with FIGS. 1 and 5–6. When a viewer presses the power or "ON/OFF" button on the PTV 10 or a remote control device, the CPU 16 will instruct the primary projection unit 12 to turn off 210. Next, the program logic will either prompt the viewer for a response and/or it will search the memory 18 to determine if the viewer has chosen to project an image onto the screen 14 when the PTV 10 is in the "OFF" mode. Depending on the stored information or the viewer's response, the CPU 16 will decide whether or not to activate 212 the auxiliary projection system 22. If the decision 212 is "NO", the PTV 10 is completely turned "OFF" 214 resulting in a dark, blank screen 13 as shown in FIG. 6. If the decision 212 is "YES", the program logic turns on and activates 216 the auxiliary projector 22 and image source 24 causing the transmission of an image or video from the image source 24 to the auxiliary projector 22. The auxiliary projector 22, in turn, projects the image 15, 17 on to the screen as shown in FIG. 5. Depending upon the viewer's preference, the projected image may be a family portrait, a snap shot of a child, a home movie, an aquarium video, a nature scene video, a screen saver type video, or any number of other images, videos, slide-shows, or video-like presentations. As a result, the PTV 10 is advantageously transformed in the "OFF" mode into an aesthetically pleasing decorative feature of room in which it is located.

The program logic of the PTV 10 may activate the image source 24 in a number of the different ways. Some examples include: running program logic to retrieve an image or video from memory 218 and transmit it to the auxiliary projector 22; instructing the auxiliary projection unit 22 to project an image from a photographic slide stored in a receptacle 226; instructing the computer 26, the CD 27, the DVD 25, or the Other image source 29 to play 220, 222, 230 and 224, and, thus, causing it to power up and run a set-up program that plays and transmits the desired image or video to the projection unit 22; or instructing the VCR 28 to play and transmit the video to the projection unit 22. As noted above, if the image source 24 is not coupled to the program logic of the PTV 10, the activation step 216 could be performed by manually turning on the device and manually causing it to play and, thus, transmit the image or video to the auxiliary projector 22.

When desired, the viewer may choose to turn off the auxiliary projection system 20 by pressing the power button of the PTV 10 or remote. Program logic will then prompt the viewer to decide whether or not to turn off the auxiliary projection system 20. If the decision to turn off the auxiliary system 232 is "Yes", the program logic will instruct the auxiliary projector 22 and image source 24 to power off 234. Optionally, the image source 24 may be manually turned off. The viewer will also be prompted to decide whether or not to turn on the PTV If the decision 236 is "NO", the PTV 10 is completely turned "OFF" 238 resulting in a dark, blank screen 13 as shown in FIG. 6. If the decision 236 is "YES", the primary projection unit 12 is turned "ON" and the PTV 10 operates like a conventional PTV.

Figure 4:
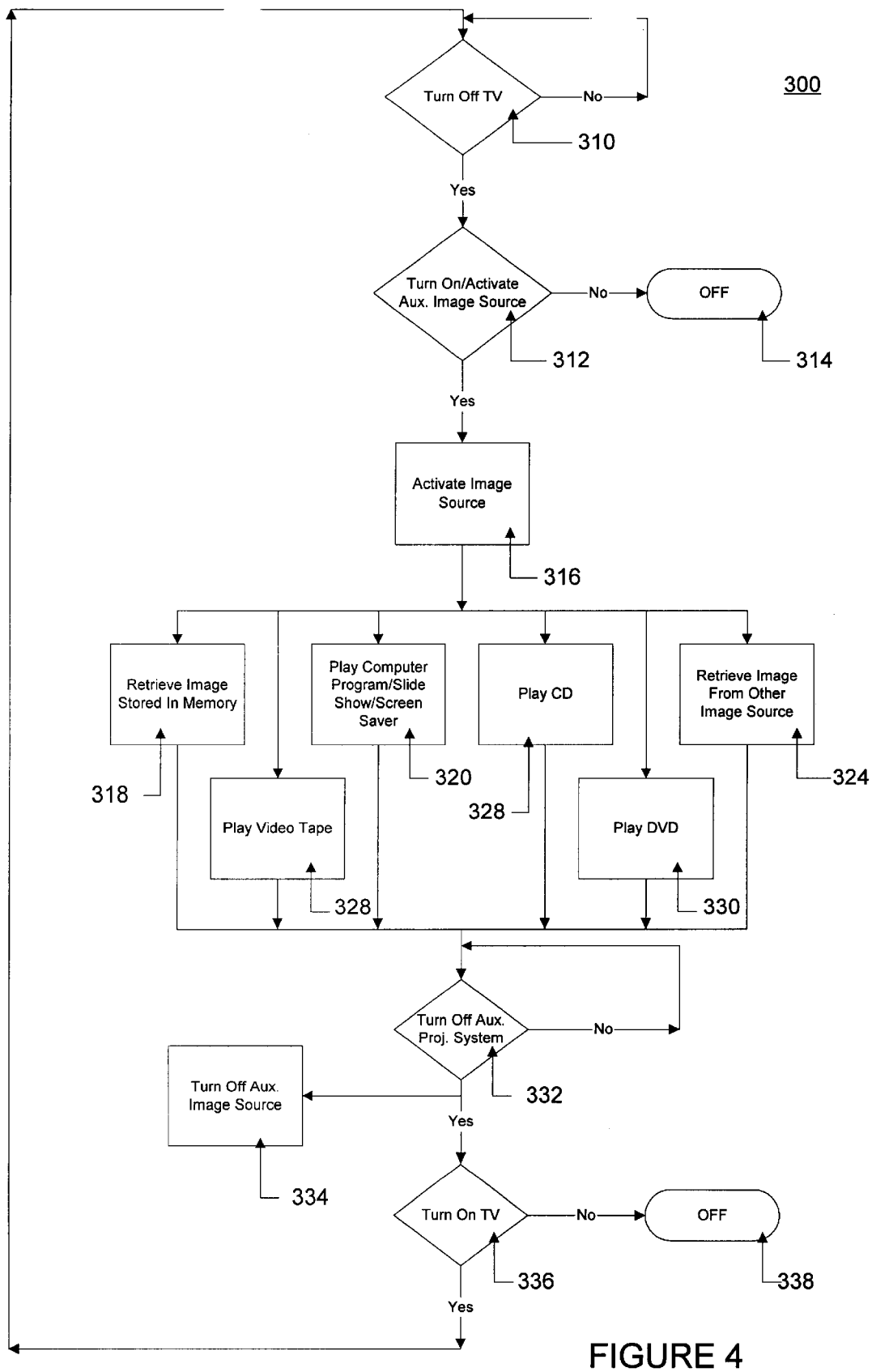
FIG. 4 is a flow chart illustrating the operation of an alternative embodiment of the auxiliary projection system of the present invention.

Referring to FIG. 4, the operation 300 of the alternative embodiment shown in FIG. 2 is shown. When a viewer presses the power or "ON/OFF" button on the PTV 110 or a remote control device, program logic will either prompt the viewer for a response and/or it will search the memory 118 to determine if the viewer has chosen to project an image onto the screen 114 when the PTV 110 is in the "OFF" mode. Depending on the stored information or the viewer's response, the CPU 116 will decide whether or not to activate 312 the auxiliary image projection system 120. If the decision 312 is "NO", the PTV 110 is completely turned "OFF" 314 resulting in a dark, blank screen. If the decision 312 is "YES", the program logic activates 316 the image source 124 causing the transmission of an image or video from the image source 124 to the projector unit 112. The projector unit 212, in turn, projects the image onto the screen, transforming the PTV 110, in the "OFF" mode, into an aesthetically pleasing decorative feature of room in which it is located.

The program logic of the PTV 110 may activate 316 the image source 124 in a number of the different ways. Some examples include: running program logic to retrieve an image or video from memory 318 and transmit it to the projector unit 112; instructing the computer 126, the CD 127, the DVD 125, or the Other image source 129 to play 320, 322, 330 and 324, and, thus, causing it to power up and run a set-up program that plays and transmits the image or video to the projection unit 112; or instructing the VCR 128 to play and transmit the video to the projection unit 112.

When desired, the viewer may choose to turn off the auxiliary projection system 120 by pressing the power button of the PTV 10 or remote. Program logic will then prompt the viewer to decide whether or not to turn off the auxiliary projection system 120. If the decision to turn off the auxiliary system 332 is "Yes", the program logic will instruct the auxiliary image source 124 to power off 334, and also prompt the viewer to decide whether or not to turn on the PTV 110. If the decision 336 is "NO", the PTV 10 is completely turned "OFF" 338 resulting in a dark, blank screen. If the decision 336 is "YES", the PTV 110 operates like a conventional PTV.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A projection television set comprising:

an enclosure, a viewing screen mounted in the enclosure, the viewing screen comprising a viewing area, a primary projection system mounted in the enclosure and coupled to the entire viewing area of the viewing screen, and a secondary projection system mounted in the enclosure and coupled to the same entire viewing area of the viewing screen to which the primary projection system is coupled, wherein the secondary projection system is configured to project an image onto the screen when the primary projection system is turned off.

2. The projection television set of claim 1 further comprising programmable logic coupled to the primary projection system and the secondary projection system and adapted to turn off the primary projection system and to direct the secondary projection system to project an image onto the screen when the primary projection system is turned off.

3. The projection television set of claim 1 wherein the secondary projection system comprises a projector.

4. The projection television set of claim 3 wherein the secondary projection system comprises an image source operably coupled to the projector.

5. The projection television set of claim 4 wherein the image source comprises images stored in a memory.

6. The projection television set of claim 4 wherein the image source comprises a photographic slide stored in a receptacle of the projector.

7. The projection television set of claim 4 wherein the image source comprises a computer.

8. The projection television set of claim 4 wherein the image source comprises a DVD device.

9. The projection television set of claim 4 wherein the image source comprises a CD device.

10. The projection television set of claim 4 wherein the image source comprises a VCR.

11. A projection television set, comprising:

an enclosure, a viewing screen mounted within the enclosure, a primary projection unit mounted within the enclosure, a mirror mounted within the enclosure and optically coupled to the viewing screen and the primary projection unit, a secondary projection unit mounted within the enclosure and optically coupled to the same area of the viewing screen to which the primary projection system is coupled, and programmable logic coupled to the primary and secondary projection units, the logic being adapted to direct the projection of an image from the secondary projection unit onto the screen when the primary projection unit has been turned off.

12. The projection television set of claim 11 further comprising an image source operably coupled to the secondary projection unit.

13. The projection television set of claim 12 wherein the image source comprises images stored in a memory.

14. The projection television set of claim 12 wherein the image source comprises a photographic slide stored in a receptacle of the secondary projection unit.

15. The projection television set of claim 12 wherein the image source comprises a computer.

16. The projection television set of claim 12 wherein the image source comprises a DVD.

17. The projection television set of claim 12 wherein the image source comprises a CD.

18. The projection television set of claim 12 wherein the image source comprises a VCR.

19. A projection television set, comprising:

an enclosure, a viewing screen mounted in the enclosure, a primary projection system mounted in the enclosure and coupled to the viewing screen, a secondary projection system mounted in the enclosure and coupled to the same area of the viewing screen to which the primary projection system is coupled, and programmable logic coupled to the primary projection system and the secondary projection system and adapted to turn off the primary projection system and to direct the secondary projection system to project an image onto the screen when the primary projection system is turned off.

20. The projection television set of claim 19 wherein the secondary projection system comprises a projector.

21. The projection television set of claim 20 wherein the secondary projection system comprises an image source operably coupled to the projector.

22. The projection television set of claim 21 wherein the image source comprises images stored in a memory.

23. The projection television set of claim 21 wherein the image source comprises a photographic slide stored in a receptacle of the projector.

24. The projection television set of claim 21 wherein the image source comprises a computer.

25. The projection television set of claim 21 wherein the image source comprises a DVD device.

26. The projection television set of claim 21 wherein the image source comprises a CD device.

27. The projection television set of claim 21 wherein the image source comprises a VCR.

* * * * *